United States Patent
Fazekas

(10) Patent No.: US 7,594,424 B2
(45) Date of Patent: Sep. 29, 2009

(54) AUTOMATED TIMER AND SETPOINT SELECTION FOR PNEUMATIC TEST EQUIPMENT

(75) Inventor: Jonathan Mark Fazekas, Hebron, KY (US)

(73) Assignee: Cincinnati Test Systems, Inc., Cleves, OH (US)

( * ) Notice: Subject to any disclaimer, the term of this patent is extended or adjusted under 35 U.S.C. 154(b) by 123 days.

(21) Appl. No.: 11/336,350

(22) Filed: Jan. 20, 2006

(65) Prior Publication Data

US 2007/0169543 A1 Jul. 26, 2007

(51) Int. Cl.
G01M 3/02 (2006.01)

(52) U.S. Cl. .......................................................... 73/37

(58) Field of Classification Search ............... 73/200, 73/199, 12.07, 49.2, 816, 825, 837, 840, 73/862.583, 37; 303/9.66; 128/204.23
See application file for complete search history.

(56) References Cited

U.S. PATENT DOCUMENTS

| | | | | |
|---|---|---|---|---|
| 4,272,985 A | | 6/1981 | Rapson, Jr. et al. | 73/49.2 |
| 4,587,619 A | * | 5/1986 | Converse et al. | 702/51 |
| 5,363,689 A | | 11/1994 | Hoffmann et al. | 73/3 |
| 5,385,056 A | * | 1/1995 | Marsh et al. | 73/861 |
| 5,535,624 A | * | 7/1996 | Lehmann | 73/149 |
| 5,546,789 A | | 8/1996 | Balke et al. | 73/40 |
| 5,915,270 A | * | 6/1999 | Lehmann | 73/49.2 |
| 6,279,383 B1 | | 8/2001 | Balke et al. | 73/40 |
| 6,308,556 B1 | | 10/2001 | Sagi et al. | 73/40 |
| 6,321,728 B1 | * | 11/2001 | Ohkuma | 123/520 |
| 6,487,892 B1 | * | 12/2002 | Ito et al. | 123/520 |
| 6,584,828 B2 | | 7/2003 | Sagi et al. | 73/40 |
| 6,626,027 B1 | | 9/2003 | Davey | 73/40 |
| 6,741,955 B2 | | 5/2004 | Rutherford et al. | 703/2 |
| 6,966,215 B2 | * | 11/2005 | Amano et al. | 73/49.2 |
| 7,290,440 B2 | * | 11/2007 | Gocho | 73/49.2 |
| 7,353,692 B2 | * | 4/2008 | Gocho | 73/40 |
| 2002/0056452 A1 | * | 5/2002 | Brewer et al. | 128/202.22 |
| 2004/0000187 A1 | * | 1/2004 | Kobayashi et al. | 73/49.2 |

FOREIGN PATENT DOCUMENTS

JP 2002073088 * 3/2002

* cited by examiner

*Primary Examiner*—John Fitzgerald
(74) *Attorney, Agent, or Firm*—Wood Herron & Evans LLP

(57) ABSTRACT

A fill time and stabilize and measurement time are determined for a pneumatic testing procedure. The fill time is computed by identifying, in the filling of a sample unit, a time when a substantial portion of variations of a measured variable (due to stabilization) are completed. The stabilize and measurement time is determined by comparison of the measurement variable behavior when filling sample unit(s) that do not leak, to the measurement variable behaviors when filling a sample unit that is in communication with an orifice simulating a leak. A measurement performance factor may be computed from this data at each of several possible times after a unit is filled. A gauge repeatability factor may be computed based on variance of nonleaking units at each possible time, compared to the variable change made on a sample unit when coupled to a leak-simulating orifice. Either factor may be used to select a stabilize and measurement time.

20 Claims, 5 Drawing Sheets

AUTOMATED TIMER AND SETPOINT SELECTION FOR PNEUMATIC TEST EQUIPMENT

FIELD OF THE INVENTION

The present invention relates to pneumatic testing of fluid or gas carrying components such as automobile intake manifolds, fuel rails, refrigerant lines and the like.

BACKGROUND OF THE INVENTION

In many applications, fluid or gas carrying parts form critical components of a system. For example, in an automobile, fluid carrying parts couple the vehicle fuel supply to the engine intake and must be entirely free of leaks to prevent fuel spillage and a potentially dangerous condition. In a similar way, refrigerant carrying lines in a home air-conditioning system must be free of leaks so that refrigerant is unable to escape from the cooling system causing an air conditioning failure. The criticality of these parts mandates, in some instances, 100% testing of manufactured parts to verify the absence of leaks therein.

Pneumatic testing of a fluid carrying part or "unit under test" (UUT) typically involves filling the unit with gas at a specified target pressure, monitoring the pressure within the unit for a specified period, and then releasing the pressure within the unit and determining from the pressure profile experienced within the unit whether the unit is sufficiently leak free. Leaks are identified by an excessive reduction of pressure within the unit during the period that it is pressurized. To ensure that reductions in pressure will be accurately detected, after the unit is filled, it is isolated from the source of pressurized fluid and its pressure is monitored for a suitably lengthy period of time to detect a pressure drop caused by the smallest allowable leak.

While this method is an relatively straightforward to describe, its implementation in practical examples is fraught with the number of difficulties. Specifically, in a practical implementation, it is necessary that the entire pressure testing cycle including fill, test and exhaust be performed in the shortest possible time to allow for the greatest possible throughput of units being tested at the testing fixture. Throughput is particularly critical where all units must be tested on a fast-moving production line. If a long enough time is provided to stabilize the pressure within a unit prior to isolation of the unit from the pressurized source, transient thermodynamic effects will be eliminated, and the unit pressure will be well stabilized and any subsequent pressure change can be reliably attributed to leakage from the unit. However, in a product line environment where throughput is critical, there is a need to test the unit as rapidly as possible, without waiting a very long time for stabilization.

Unfortunately, rapid testing compromises the objective of obtaining a stabilized pressure within the unit prior to initiating a leakage test on the unit. This is due to a number of causes. First, the rapid influx of pressurized gas into the unit compresses the gas within the UUT, which causes the gas to release heat to the UUT, which then cools, causing a reduction of pressure within the unit after the unit has been filled. Cooling of gas within the unit will not alter the measured pressure within the unit so long as the unit remains connected to the pressurized gas source. However, once the unit is disconnected from the pressurized source, cooling of the gas within the unit will cause a pressure drop which can be easily confused with the pressure drop that is caused by leakage. A second difficulty arises from the fact that all units, including metal fluid carrying units, are subject to expansion and stretch when pressurized. Unit expansion may be caused by heat transfer from the pressurized fluid into the unit, and the unit may also deform elastically in response to applied pressure. Heat-related expansion and elastic deformation will be collectively referred to as "stretch" in the following. Unit stretch will also cause a reduction of pressure of the fluid filled unit, if the unit has been isolated from the pressurized source before such stretch effects have been fully dissipated.

FIG. 1 illustrates the features of the pressurization profile created by a pneumatic test fixture, that has been exaggerated in scale to show the combined effect of the various phenomena discussed above. Specifically, during an initial period 10, the pressure of the unit increases rapidly as the unit is brought into fluid communication of the pressurized source. The pressure of the interior of the unit will rapidly approach the pressure of the source, and remain at this pressure as long as the source remains in fluid communication with the interior of the unit. (It will be noted, however, that due to variation in the regulation of the pressure of the source, the actual unit pressure achieved will have variation that corresponds to the variation in the pressure source as seen at 10A, 10B and 10C; this possible source of variation is typically contained by the use of a pressure source that has sufficiently low regulation error that it brings each successive unit within an acceptably close proximity to a desired target starting pressure.)

Although the unit will be held at the source pressure so long as the source is connected, if the source is disconnected soon after filling, the unit's interior pressure will reduce due to the combined effects of unit stretch and cooling. These effects are illustrated in a stabilization region 12 of the pressure profile of FIG. 1. The extent of the pressure drop exhibited in region 12 of the curve is a function of the amount of stretch of the unit, and the amount of gas cooling that remains to be completed after the end of the initial pressurization period, in addition to any pressure drop caused by leakage. If the initial pressurization shown in portion 10 of the pressurization curve is performed for a longer period, unit stretch and fluid cooling will reach a greater level of completion during this period and the interior pressure of a non-leaking unit will be reduced to a lesser amount in region 12 after the fluid source is disconnected from the interior of the unit. Furthermore, it will be noted that any variation in regulation pressure will be reflected as an offset to the pressure curve in the stabilization region 12, as seen at 12a, 12b and 12c.

At the completion of the settling behaviors that begin in region 12, the unit's pressure will stabilize, unless there is a leak in the unit. The divergence of pressure due to a leak will be apparent after the passage of time, represented in region 14 of FIG. 1, by the divergence of the pressure profile 14a of a non-leaking unit, from the pressure profile 14b of a leaking unit. Region 14 of FIG. 1 represents a far greater period of time then region 12, sufficiently long for a pressure leak to create a measurable divergence of the pressure profiles 14a dn 14b. It will be appreciated that a leak will also cause divergence in region 12, but over the time period represented in region 12 this divergence will be very small as compared to the effects of stretch and cooling.

To determine whether a part is leaking, therefore, after a sufficient time for stabilization in region 12, the test instrument may begin to monitor the pressure loss within the unit in region 14 to determine whether the pressure loss is within acceptable limits. Leak-free units will be characterized by a relatively stable pressure over time as seen at 14a, whereas leaking units will be characterized by a linear reduction in pressure of the interior of the unit that continues beyond stabilization, as shown at 14b. The testing period of region 14 must be sufficiently long that a reduction in pressure caused by the minimum size acceptable leak can be reliably identified during period 14, and furthermore, that the pressure reduction caused by a leak is sufficiently large to be reliably distinguished from variations in the stabilized unit pressure that are caused by normal variance in unit stretch, thermal effects, electrical transducer noise, operating temperature, and pressure regulation accuracy. That is, the test period of region 14 must be long enough for the pressure drop on curve 14b to be substantially greater than the lowest stable pressure that is likely to be seen on a leak-free unit, such as the relatively low stable pressure shown at 12c.

After testing for pressure drops caused by leaks, by monitoring pressure for a suitable time period in region 14, the pressure within the unit is released causing a rapid reduction of pressure in region 16. Pressurizing gas is typically vented from the unit to a collection system, or alternatively vented to atmosphere.

As can be seen by examining the behaviors discussed above and illustrated in FIG. 1, it is necessary to choose time periods in regions 10 and 12 of the pressurization cycle that are sufficient to repeatably fill a unit and settle thermodynamic and stretch effects that may otherwise be mistaken for unit leakage. If, for example, the pressurization period 10 is made too short, the effect of cooling, heat transfer and stretch to the unit will cause too large of a reduction of pressure in region 12, causing the unit to be significantly outside of the target pressure for acceptance in region 14. However, it is not necessary to wait for all of the effects of heat transfer and stretch to dissipate, only long enough for those effects to be repeatable so they can be accurately subtracted from a leak rate calculation. Thus, it can be seen that region 14 in FIG. 1 begins prior to the completion of the stretch and cooling related pressure decays that begin in region 12. This is important as if an extremely long period is utilized in region 12 for pressurization or an extremely long period is utilized in region 14 for stabilization, throughput of the testing fixture will be dramatically reduced.

It is, however, necessary to choose a time period for testing in region 14 that is sufficient to accurately differentiate between a leaking unit having the minimum unacceptable leak, from variations that might be experienced during pressurization and stabilization of leak-free units. Too short of a test period might permit a leaking unit to pass through undetected, or force the use of a target pressure that rejects leak-free units that have a particularly low stabilized pressure.

In the past, the lengths of the pressurization period 10, settling period 12 and test period 14 have been chosen based on experience and trial and error, by test engineers observing the pressure profiles of the unit, and choosing an apparently effective duration of time for each of these phases of the test cycle. Unfortunately, this method typically produces a less than optimum timing for the pressurization cycle because portions of the cycle are often made longer than is necessary to achieve sufficient stability of the testing process for an effective test.

It is thus an object of the present invention to provide an automated methodology for selecting and controlling the periods applied to pneumatic cycle testing of a unit, and to provide a method of selecting those testing periods in a systematic way that produces more optimal and shorter cycle times for pneumatic testing.

SUMMARY OF THE INVENTION

The above objects are met in accordance with the invention, which features automated methods for determining pneumatic test timing.

Specifically, in a first aspect, the invention features an automated method of determining a fill time to be used with units subject to a pneumatic testing procedure, comprising filling a sample unit and monitoring a variable such as pressure or flow reflecting the retention of gas or fluid in the sample unit and stabilization of said sample unit following filling, and selecting a fill time that is a time when a substantial portion of variations of said variable due to stabilization are completed in said sample unit. Subsequent units subject to pneumatic testing may then be filled for the fill time, and measured for acceptable performance thereafter.

In another embodiment, the invention features a method of determining a time to measure changes caused by leakage within units subject to a pneumatic testing procedure. A sample unit is filled and a variable such as pressure or flow is monitored. Then, the unit is emptied and refilled while in communication with an orifice simulating a leak, and the variable is monitored with the orifice open. Then, from the measurements, a measurement performance factor is computed at each of several possible times after a unit is filled, and a stabilization time is selected based upon the computed performance factors. Subsequent units may then be subjected to pneumatic testing by waiting until the stabilization time, before measuring for acceptable performance.

In specific embodiments, the performance factor may be a function of a difference DIFF between variable measurements with and without leakage, and a calibration ratio CR, which is proportional to a difference between variable measurements measured with and without leakage, and inversely proportional to the total leakage measured.

When a pneumatic testing procedure is constrained to be completed within a specific time, the method may be applied only during the time available for pneumatic testing after completion of a fill, to select a best time for measurement from within the available time.

In another aspect, the invention features a method of determining a time to measure changes caused by leakage within units subject to a pneumatic testing procedure, using a gauge repeatability factor. One or more non-leaking sample units are filled, and a variable such as pressure or flow in the units is measured, for several sample measurements. Then, from the measurements made, a variance of the measured variable is computed at each of several possible times. Then, a gauge repeatability factor is computed at each of said several possible times, based on the computed variance at each possible time, and the a measurement of the variable change made on a sample unit when coupled to a leak-simulating orifice. A time may then be selected at which the gauge repeatability factor indicates satisfactory performance, and used for measurements.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 2:
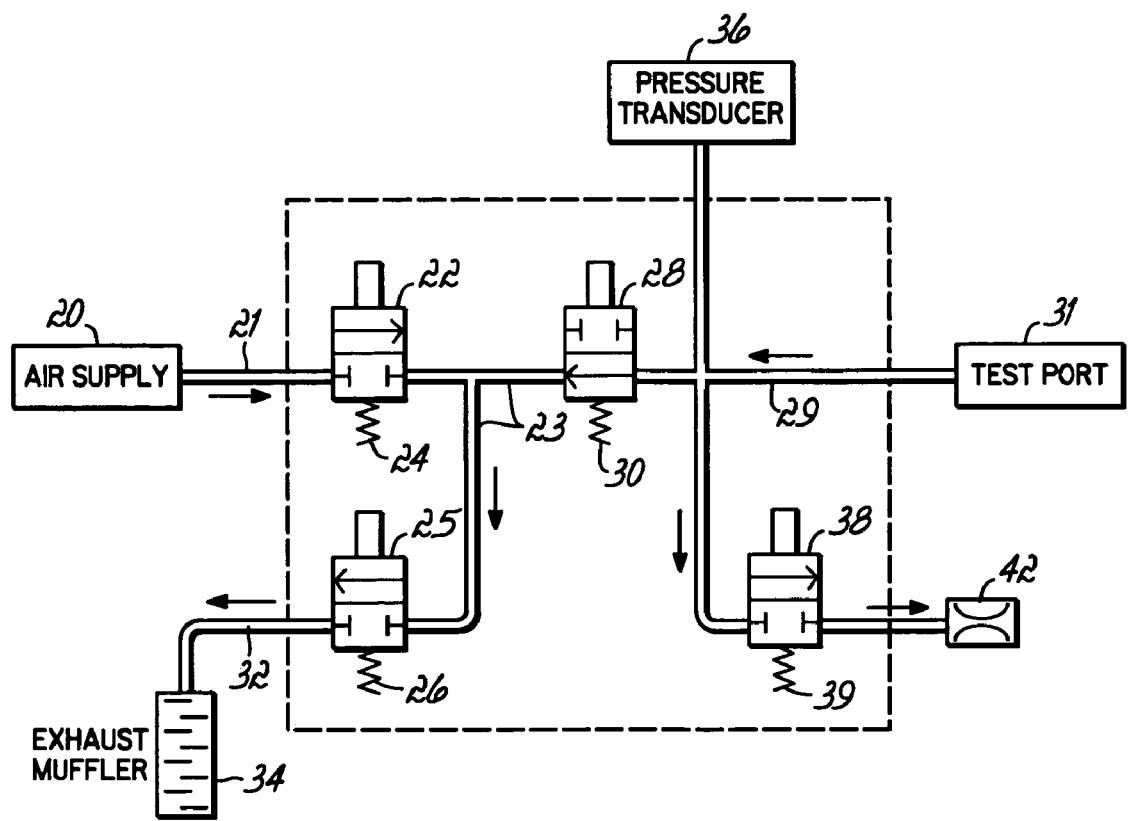
FIG. 2 illustrates a testing device for performing pneumatic testing in accordance with principles of the present invention.

Referring now to FIG. 2, a testing platform for performing pneumatic testing of parts is illustrated. This testing platform includes an air supply 20 providing air pressurized to a pressure of, e.g., 60-130 pounds per square inch. This air supply is coupled to a fluid line 21 connected to a two-way normally closed valve 22. Normally closed valve 22, as illustrated, will normally isolate fluid line 21 from fluid line 23 unless a control signal is delivered to the valve 22 via connection 24.

Fluid line 23 connects pressurized air from valve 22 and supply 20 to normally closed two-way valve 25 and normally open two-way valve 28. Normally open valve 28 connects between fluid line 23 and fluid line 29 and permits free flow from fluid line 29 to fluid line 23 but will block flow from fluid line 23 to fluid line 29 unless actuated by a control signal delivered to input 30. The fluid line 29 is connected to the test port 31 to which the unit under test is attached.

To perform a fill operation on the unit under test connected to test port 31, air from supply 20 is allowed to pass from fluid line 23 to fluid line 29 by actuating normally closed valve 22 and normally open valve 28. So long as valves 22 and 28 are actuated, the unit under test connected to test port 31 will be brought to the pressure of the air provided by supply 20. To discontinue filling the unit under test, the control signal is removed from control input 24 of normally closed valve 22, causing that valve to close, and the control signal is removed from control input 30 of normally open valve 28 causing that value to close (upon any reverse flow from fluid line 29 to fluid line 23). The unit under test will then remain pressurized until it is depressurized at the completion of the procedure. At the completion of the procedure, normally open valve 28 is again actuated by a control signal applied to input 30, and normally closed valve 25 is actuated by a control signal applied to input 26, to permit flow of pressurized air from fluid line 29 and the unit under test to fluid line 23 and through normally closed valve 25.

Normally closed valve 25 couples exhaust air from fluid line 23 to fluid line 32 which connects to an exhaust muffler 34. Normally closed valve 25 will not permit flow between fluid line 23 and fluid line 32 unless activated by control signal on input 26, which signal is applied when evacuating air and pressure from the unit under test at conclusion of the test operation. Exhaust muffler 34 reduces the noise created by the rapid exhaust of pressurized air when the unit under test is depressurized.

A pressure transducer 36 is connected to fluid line 29 and thus measures the pressure interior of the unit under test connected to test port 31. This allows measurement of the pressure within the unit under test during a testing procedure. The output signal from the pressure transducer 36 is utilized by a control system (not shown) which first computes the appropriate timing for fill, stabilization, test and exhaust phases of a testing procedure, and subsequently performs testing cycles, using the measured pressure during the test phase of those testing cycles to determine whether tested parts have unacceptable leaks.

FIG. 2 further illustrates a normally closed valve 38 coupled between fluid line 29 and a fluid line 40, which leads to an orifice 42. Normally closed valve 38 and orifice 42 may be utilized in setup of pneumatic testing procedures, as explained in greater detail below. Specifically, orifice 42 may be selected to have a flow rate that models the minimum rejectable (or maximum acceptable) leakage rate of the units that will be tested by attachment to port 31. As is explained in further detail below, normally closed valve 38 may be actuated by a control signal 39 to permit controlled leakage from fluid line 29 to model the leakage that would be experienced by a minimally rejectable unit under test. By modeling the leakage of a minimally rejectable unit under test, in accordance with principles of the present invention, one may select a stabilization and testing time that is sufficient to accurately detect rejectable leaking parts, without being excessive in duration.

Figure 3:
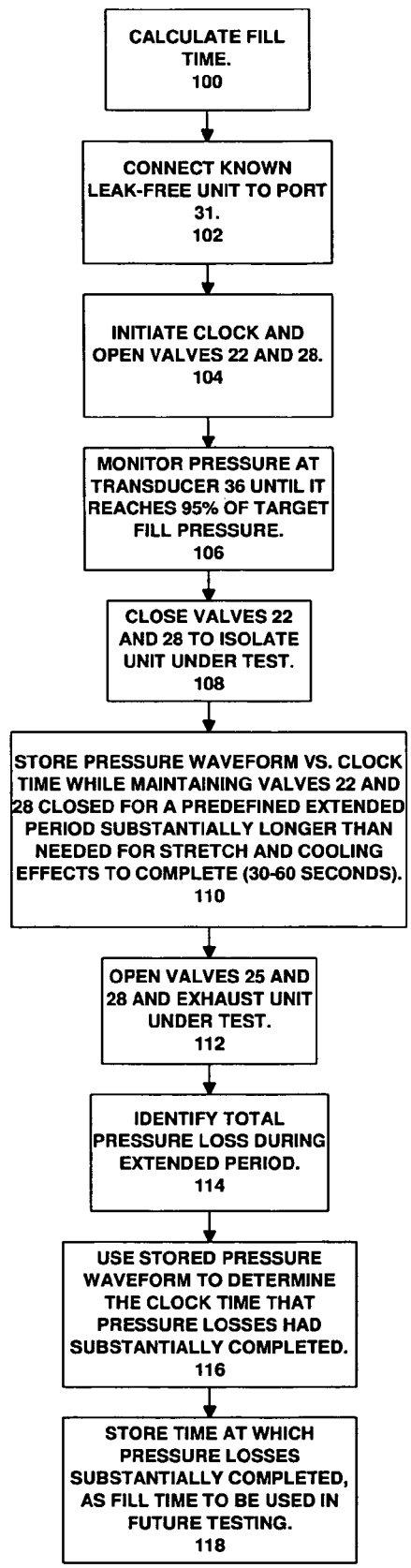
FIG. 3 is a flow chart of a process for computing a filling time.

Referring to FIG. 3, the process for computing an appropriate fill time is illustrated by step 100 and the following. In step 102, a known leak free unit is attached to port 31 (FIG. 2). Then a clock/timer is initiated and valves 22 and 28 are opened in step 104. At this point the unit under test will fill rapidly with pressurized air or other test gas. In step 106, the pressure is monitored at transducer 36 continuously as pressurized air or other gas is flowing into the unit under test. The pressure is monitored until it reaches 95% of the targeted fill pressure (the target typically being the pressure of the pressure source 20). The resulting fill time is relatively rapid, which permits the most effective evaluation of thermal and stretch related settling of the unit under test.

Once the pressure of the unit under test reaches 95% of the target fill pressure, in step 108 valves 22 and 28 are closed to isolate the unit under test from the pressure source. Because the unit under test has been filled rapidly and has not been stabilized to any significant extent, the unit will then undergo transient pressure changes caused by stretch and cooling. In step 110, the pressure waveform is monitored at pressure transducer 36, and stored as a function of time, while the unit is isolated by maintaining valves 22 and 28 closed. The pressure waveform is monitored and stored during an extended period of predefined length, such as 30 to 60 seconds, which is sufficiently long for any potential stretch or cooling effects to be completely resolved. At the end of this predetermined time, in step 112, valves 25 and 28 are opened to exhaust the unit under test.

The data gathered in the proceeding steps is then analyzed to determine an appropriate fill time. Specifically, in step 114, the collected pressure wave form is analyzed to identify the total pressure loss experienced from the time that the valves 22, 28 were closed in step 108 and the end of the extended period of step 110. This total pressure loss represents all of the pressure loss experienced due to cooling and stretch effects. The stored pressure waveform is then analyzed to determine the time at which the pressure losses identified in step 114 were substantially completed. (Typically the pressure losses due to cooling and stretch will have substantially completed within a few seconds after the unit under test was isolated from the pressurized source, although to confirm this data is gathered for a much longer period of time.) The time of substantially complete pressure loss may be identified as, for example, a time when there has been 95% of the total pressure loss over the extended period during which data is gathered in step 114. Other measures of a substantial portion of the total pressure loss may also be utilized in accordance with principles of the invention. The important point in step 116 is to determine a time at which a sufficient amount of the cooling and stretch related pressure losses have completed, so that those effects are constrained during subsequent tests.

In step 118, the fill time to be used in subsequent tests is determined. Specifically, the time at which the pressure losses have substantially completed, as previously identified in step 116, is used as the fill time in subsequent steps. It will be noted that the fill time thus selected will include sufficient time not only to fill the part with pressurized gas, but also regulate the pressure within the part during a substantial portion of cooling or stretch of the part. Thus, the selected fill time is a sufficient fill time to ensure those effects have been dissipated and will not substantially affect subsequent measurements that seek to determine the presence or absence of leakage.

Figure 4:
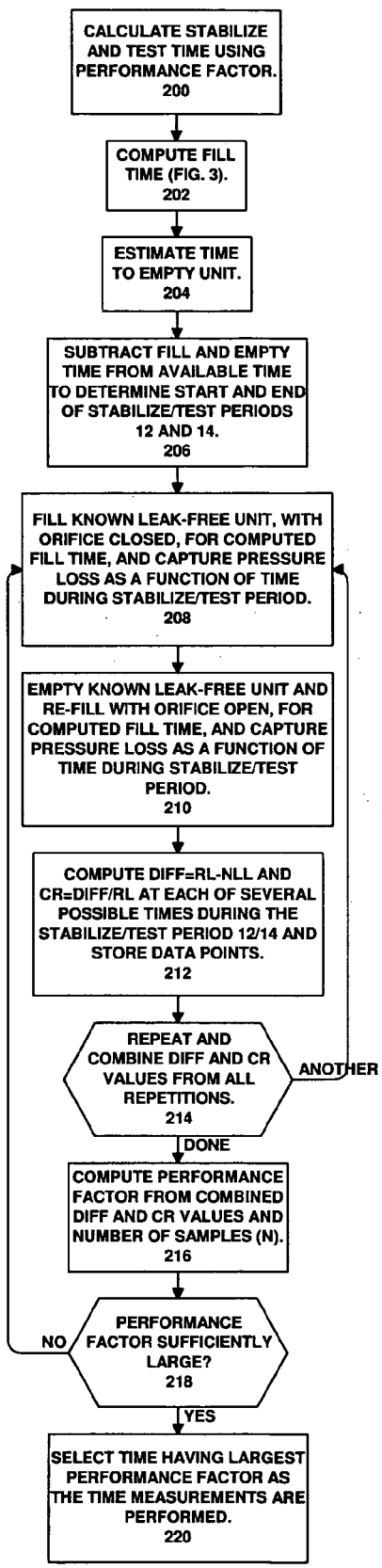
FIG. 4 is a flow chart of a process for computing a stabilization and testing time based upon a total available time for testing.

Referring now to FIG. 4, a methodology for computing the duration of the stabilization and test regions 12 and 14 of a testing cycle (see FIG. 1) can be explained. The method 200 shown in FIG. 4 computes the stabilization test times for a measurement that is constrained to a given total measurement time, e.g., because of the throughput of neighboring manufacturing stations in a production line requires measurements to be completed in a set maximum time. Thus, the method of FIG. 4 may be used when the measurement time available is known in advance and fixed.

The first step of the method of FIG. 4 is to compute a fill time to be used with the unit under test, utilizing the method of FIG. 3 described above. This step 202 will produce a fill time, i.e. a duration of region 10 in FIG. 1, measured from the beginning of a test cycle. Next, in step 204 a time required to exhaust the unit under test is estimated. This time may be relatively short, and typically would be a function of the volume of air or gas held by the unit under test and the size of the orifice connected to the test port 31.

After step 204 in step 206 the computed fill time and estimated time to exhaust the unit are subtracted from the available time to perform a completed test. The result is the length of time that is available for the stabilize period 12 and test period 14 shown in FIG. 1. However, further steps need to be performed to determine what portion of the time available should be used for stabilization and what portion for testing, i.e., when the testing of the unit pressure should occur to provide a reliable test.

For this process, in step 208 a unit known to be leak free is filled, with orifice 42 closed. The unit is filled for the computed fill time identified in step 202, and thereafter the unit is isolated from the pressure source as described above, and then the pressure loss in the unit is captured as a function of time for the entire period available for the stabilize and test periods 12 and 14. This step 208 will capture the profile of pressure decay of a known good unit.

Figure 1:
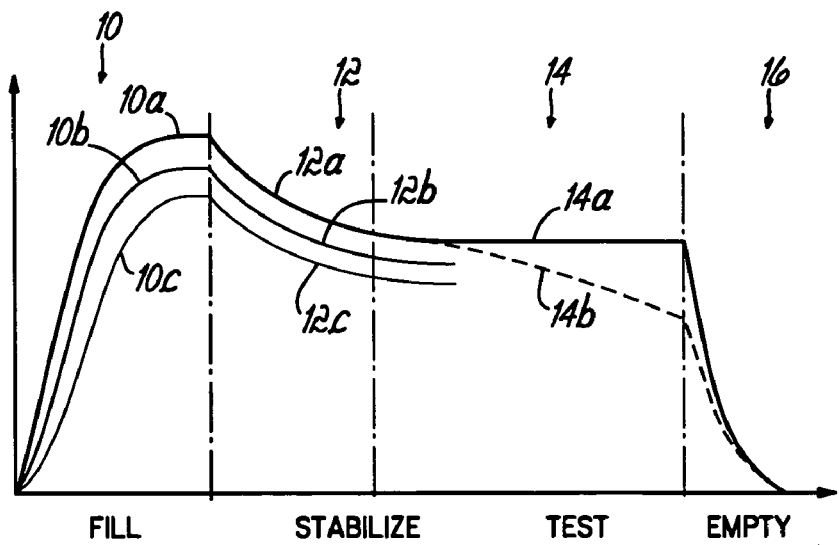
FIG. 1 illustrates typical pressure profiles created during filling, stabilization, testing and exhausting of units being pneumatically tested.

In the next step 210 a similar test is performed, but with the orifice 42 of FIG. 1 open, to simulate the pressure loss of a part having the minimal rejectable leak. This step 210 thus generates a second pressure decay profile corresponding to a leaking unit.

The two pressure decay profiles captured in steps 208 and 210 are then utilized in computing performance factor figures as a function of time. Specifically, at each of several times t during the stabilize and test periods 12 and 14, the factor DIFF(t) and the factor CR(t) are computed. These factors are given by the following equations.

$$DIFF(t) = RL(t) - NLL(t)$$

$$CR(t) = \frac{DIFF(t)}{RL(t)}$$

DIFF(t) is the difference between NLL(t), the pressure loss of a nonleaking unit as a function of time, and RL(t), the pressure loss of a leaking unit having the minimum rejectable leakage as a function of time. CR(t) is the calibration ratio as a function of time, and is a measure of the relative ratio of DIFF(t) to RL(t) over time. It will be appreciated that the difference in pressure loss between a leaking and nonleaking part (DIFF), will always be smaller than the pressure loss of the leaking part (RL), because both the leaking and nonleaking part will experience some pressure loss. Therefore, since DIFF<RL, DIFF/RL<1.

An operating principle in the calculation of CR, is that a difference in pressure loss is best measured when the pressures measured are still relatively large, both to reduce the time required for a measurement, and to minimize the effect of calibration errors, which are most exposed at over relatively large pressure changes. It will be appreciated that the value for CR(t) will be increased over time because the pressure differential DIFF(t) becomes larger over time, but will be decreased over time because the total pressure loss RL of a minimally leaking part also becomes larger over time. CR will therefor increase over time, to a maximum value, then decrease. The time at which there is a maximum value of CR is taken to represent the time where the most accurate measurement may be made.

The measurements and computations in steps 208, 210 and 212 are repeated several times to reduce the effects of noise in those measurements, either with the same leak-free part or different leak free parts, as shown at 214. The resulting values for DIFF(t) and CR(t) at each of several times are combined, e.g., averaged, to produce values of DIFF and CR at each of those times, for use in a gauge performance factor computation.

The gauge performance factor PF[t] is computed in step 216, for each time for which DIFF[t] and CR[t] values have been generated in steps 208, 210 and 212. The performance factor is derived from the calibration ratio value CR[t], but includes compensating factors that ensure that a sufficient number of samples N have been combined in step 218, and that a sufficient pressure difference DIFF has been measured for later use. The specific formula for PF is:

$$PF[t]=CR[t] \cdot F2[t] * F3 * 1000$$

The factors F2 and F3 are the compensating factors and are always positive and less than 1, as is the case with CR. Thus, the value of PF will range from 0 to 1000.

The factor F2 ensures that DIFF is sufficiently large, e.g., greater than 0.0005, at a given point in time. If DIFF is too small, F2 will be substantially less than 1 and will reduce the performance factor PF. DIFF can be computed by a function such as:

$$F2[t]=1-e^{-200(DIFF[t]-0.0005)}$$

where if $F2[t]<0$ then $F2[t]\equiv 0$.

Note that this formula will cause $F2[t]=0$ whenever $DIFF[t]<0.005$, and will cause $F2[t]$ to exponentially approach a value of 1 as $DIFF[t]$ becomes substantially larger than 0.0005 (e.g., when DIFF has a value of 0.0235, $F2=0.99$).

The factor F3 ensures that a sufficient number of samples N have been combined in the repetition of steps 208, 210 and 212. If an insufficient number of samples is included in a computation of PF, then F3 will be substantially less than 1 and will reduce the performance factor PF. A formula for F3 is:

$$F3=0.7+0.3(1-e^{-N})$$

Note that F3 approaches a value of 1 as the number of samples increases. When $N=1$, $F3=0.89$, when $N=2$, $F3=0.96$, and when $N=4$ or more, $F3>0.99$. If it is desired to require more samples N, the formula for F3 may be changed such that N must be larger for F3 to approach 1.

The performance factor PF is computed in step 216 at each of the times for which values of DIFF and CR were collected in steps 208, 210 and 212. The resulting performance factor measurements will typically have a maximum point at some time midway through the stabilize/test period 12, 14, representing the time at which a measurement with the greatest performance factor can be achieved. In step 218, the largest performance factor is compared to a minimum requirement. If there have been sufficient samples, the maximum performance factor will have a value that is acceptable, and the corresponding time can be used for measurements as described above. However, if insufficient samples have been taken, further samples are taken, by returning from step 218 to step 208 to generate more data.

When the method of FIG. 4 is completed, the time at which the performance factor $PF[t]$ is greatest is used as the time for pressure testing in subsequent test cycles, as shown at 220.

Figure 5:
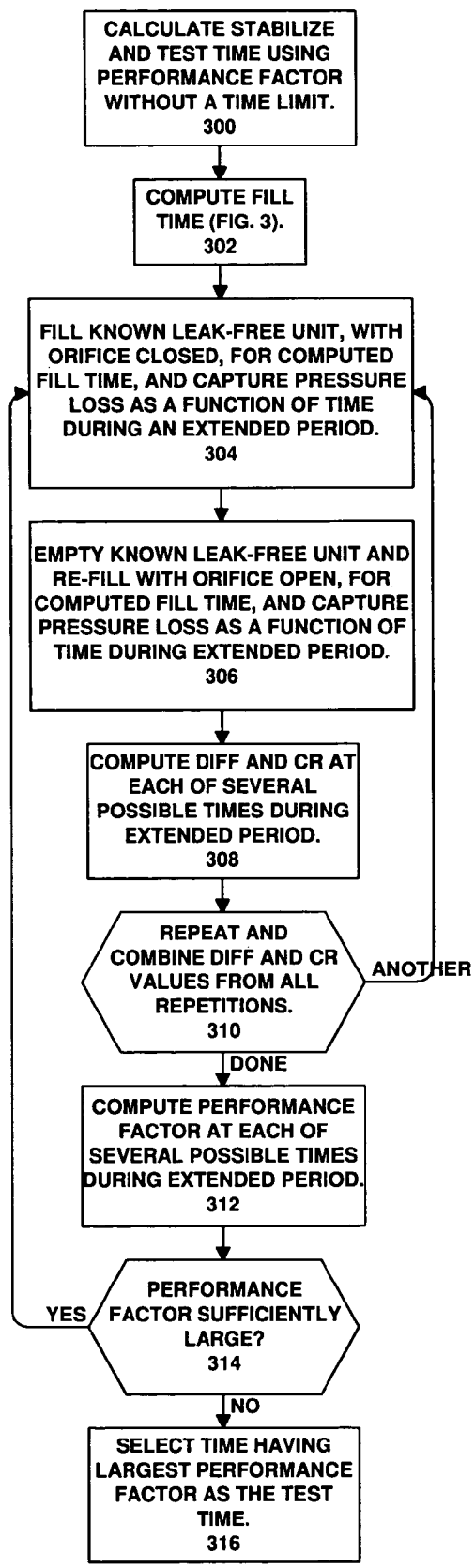
FIG. 5 is a flow chart of a process for computing a stabilization and testing time based upon performance factor computations.

Referring now to FIG. 5, a related methodology 300 is illustrated, for computing the duration of the stabilization region 12 of a testing cycle (see FIG. 1) for a measurement that is not constrained to a given total measurement time. The first step 302 of the method of FIG. 5, as in FIG. 4, is to compute a fill time to be used with the unit under test, utilizing the method of FIG. 3 described above. Next, in step 304 a unit known to be leak free is filled, with orifice 42 closed. The unit is filled for the computed fill time identified in step 302, and thereafter the unit is isolated from the pressure source as described above, and then the pressure in the unit is captured as a function of time for an elongated period, longer than any likely stabilization period that may be required (e.g., 30 to 60 seconds).

In the next step 306 a similar test is performed, but with the orifice 42 of FIG. 1 open, to simulate the results achieved with a part having the minimal rejectable leak. Thus step 306 generates a second pressure decay profile corresponding to a leaking unit.

In step 308, the profiles captured in steps 304 and 306 are used to compute $DIFF(t)$ and $CR(t)$ values at a number of possible times during the extended period.

Steps 304 and 306 are repeated, as shown at 310, a number of times, with the same or a different leak-free unit, to create combined values for DIFF and CR at each of several times.

The $CR[t]$ and $DIFF[t]$ values captured in steps 304 through 308 are then utilized in computing performance factor figures in step 312, according to the methods discussed above with reference to step 216 of FIG. 4. Thereafter, in step 314, it is determined whether the largest value of $PF[t]$ is sufficient, as discussed above referencing step 218 of FIG. 4. If not, further measurements are repeated by returning to step 304. If a sufficient value of $PF[t]$ has been found, the process completes at step 316, and the time at which the performance factor is greatest is selected as the time when a pressure test will be performed.

Figure 6:
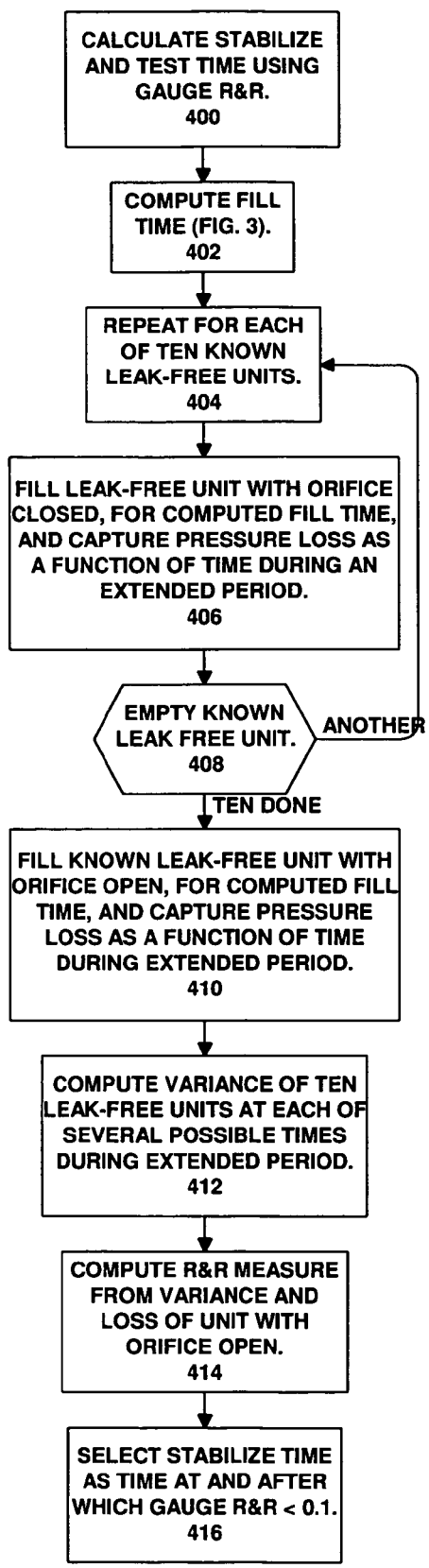
FIG. 6 is a flow chart of a process for computing a stabilization and testing time based upon gauge repeatability and reproducibility computations.

Referring now to FIG. 6, a methodology 400 is illustrated, for computing the duration of the stabilization region 12 of a testing cycle (see FIG. 1) for a measurement using gauge repeatability and reproducibility (R&R) methods. For this method, an R&R measure is computed as a function of time, according to the formula:

$$R\&R(t)=5.15 \cdot \sigma(t)/(RL(t)-NLL(t))$$

The R&R measure assesses the relative size of the reject limit and the variations in measurements of leak-free units. A smaller R&R measure reflects a decreasing likelihood that leak-free units will to be rejected.

In the R&R formula, $\sigma(t)$ represents the variations in measurements of leak-free units; at any given time a is the standard deviation of the difference between the pressure loss and no leak loss measured at that time in a sample of measurements taken on (a) unit(s) having negligible leakage. The measurement sample may be derived from a single negligible-leakage unit measured several times, or measurements of multiple negligible-leakage units.

In the R&R formula, $RL(t)$ is the reject limit, representing the pressure loss over time of a unit having a minimum rejectable leak, and $NLL(t)$ is the no-leak-loss, representing the pressure loss over time of a unit having negligible leakage, measured by combining (e.g., averaging) the pressure losses in the measurement sample at each of several times.

The first step 402 of the method of FIG. 6, as in FIGS. 4 and 5, is to compute a fill time to be used with the unit under test, utilizing the method of FIG. 3 described above. The following steps 404-408 are repeated for each of ten known leak-free units (which may be the same unit measured ten times or ten different units, or a combination), to build a sufficient data sample for the R&R computation. In step 406 a known leak free unit is filled, with orifice 42 closed. The unit is filled for the computed fill time identified in step 402, and thereafter the unit is isolated from the pressure source as described above, and then the pressure loss from the unit is captured as a function of time for an elongated period, longer than any likely stabilization period that may be required (e.g., 30 to 60 seconds). In step 408 the known leak free unit is emptied, and the process repeated, until each of ten leak free units have been tested.

After ten leak free units have been tested, in step 410 a test is performed on a leak free unit, but with the orifice 42 of FIG. 1 open, to simulate the results achieved with a part having the minimal rejectable leak. Thus step 410 generates a pressure loss profile $RL(t)$ corresponding to a leaking unit.

The ten pressure decay profiles captured in step 406 and the rejectable part profile captured in step 410 are then analyzed. Specifically, in step 412, the variance $\sigma$ of the pressure loss of the ten units tested in step 406, is computed for each of several possible times during the extended period captured in step 410. Then, in step 414, the R&R measure is computed at each of these possible times, using the computed variance a at the corresponding time, the rejectable pressure loss RL measured in step 410 at the corresponding time, and the non-leaking loss NLL obtained from the measurement sample at the corresponding time. The result is, for each of the possible times where these computations are performed, a $R\&R(t)$ value for the gauge. These $R\&R(t)$ values should initially be relatively large due to the variability in the pressure losses of nonleaking parts (due to transient effects) and relatively small differences between the rejectable loss RL and non-leaking loss NLL at early times. However, the R&R(t) values should decrease at later times in the extended period captured in steps 406 and 410, due to decreased variability in the pressure losses of nonleaking parts (as transient effects settle), and due to the steady increase in the difference between the rejectable loss RL measured in step 410 and the non-leaking loss NLL measured from the samples taken in step 406.

A R&R measure less than 0.1 is generally considered acceptable for a gauge. Accordingly, in step 416, the R&R measures computed in step 414 are evaluated to identify the time at which R&R decreases below 0.1 and after which R&R remains less than 0.1. This time is selected as the stabilize time of the gauge, thus calibrating the gauge to have the desired R&R measure at the time testing is performed.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art.

For example, while the invention has been described in the context of measuring pressure losses in a UUT after connecting the UUT to a pressure source and then disconnecting the pressure source, principles of the invention could be equally applied to measuring leaks with a flow meter coupled between a pressure source and the UUT. In that case the flow of fluid into the UUT, rather than pressure loss, would be used as the measurement variable. The flow rate in a nonleaking part would decrease to zero whereas the flow rate in a leaking part would evidence a steady state value after transient effects are settled. In an embodiment using flow as the measurement variable, the variables RL and NLL discussed above could respectively represent the integral of the flow rate through a flow meter over time, after the completion of filling (i.e. the total mass flow after filling) into a minimally leaking unit and a non-leaking unit, respectively. Using this definition of RL and NLL, other computations of the measurement time could proceed as described above. Other measurement variables and definitions for the variables RL and NLL are also possible.

The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An automated method of determining a fill time to be used with units subject to a pneumatic testing procedure, comprising
supplying pressurized gas or fluid from a source to a sample unit for a period of time sufficient to bring pressure within said sample unit near to a pressure to be used during said testing procedure,
monitoring a variable reflecting the retention of gas or fluid in said sample unit and stabilization of said sample unit following filling,
selecting a fill time that is a time when a substantial portion of variations of said variable due to stabilization are completed in said sample unit, and
filling subsequent units subject to pneumatic testing by supplying pressurized gas from a source to said subsequent units, for said fill time, and thereafter measuring said variable within said subsequent units for acceptable performance.

2. The method of claim 1 wherein variations of said variable due to stabilization include pressure changes due to cooling of pressurized gas or fluid supplied to said sample unit.

3. The method of claim 1 wherein variations of said variable due to stabilization include stretch of said sample unit.

4. The method of claim 1 wherein measuring variable changes within said subsequent units for acceptable performance comprises waiting for a stabilize time after said fill time for stabilization of said subsequent unit, and thereafter measuring said variable within said subsequent unit.

5. The method of claim 4 wherein said variable is pressure within said unit, and measuring said variable changes comprises measuring pressure loss within said subsequent unit and comparing pressure loss to a threshold.

6. The method of claim 4 wherein said variable is flow between said source and said unit, and measuring said variable changes comprises measuring flow between said source and said unit and comparing flow to a threshold.

7. An automated method of determining a time to measure changes caused by leakage within units subject to a pneumatic testing procedure, comprising
supplying pressurized gas or fluid from a source to a sample unit for a fill time that will be used in subsequent pneumatic testing procedures,
monitoring a variable within said sample unit,
exhausting said sample unit of gas or fluid and repeating said supplying step,
opening an orifice in fluid communication with said sample unit, said orifice simulating a leak in said sample unit,
monitoring said variable within said sample unit with said orifice open,
computing, from variable measurements measured in said first and second monitoring steps, a measurement performance factor at each of several possible times after the sample unit was filled,
selecting a stabilization time based upon the computed performance factors, and
filling subsequent units subject to pneumatic testing by supplying pressurized gas from a source to said subsequent units, for said fill time, and thereafter waiting until said stabilization time, and then measuring said variable within said subsequent units for acceptable performance.

8. The method of claim 7 wherein said performance factor is a function of a difference between variable measurements in said second and first monitoring steps.

9. The method of claim 7 wherein said performance factor is a function of a calibration ratio, which Is proportional to a difference between variable measurements measured in said second and first monitoring steps, and inversely proportional to the leakage measured in said second monitoring step.

10. The method of claim 7 wherein said pneumatic testing procedure is constrained to be completed within a specific time, and said monitoring steps monitor changes only during the time available for pneumatic testing after completion of said fill time.

11. The method of claim 7 wherein said fill time is selected by
supplying pressurized gas or fluid from a source to a sample unit for a period of time sufficient to bring pressure within said sample unit near to a pressure to be used during said testing procedure, monitoring a variable within said sample unit to measure changes due to stabilization of said sample unit, selecting a fill time that is a time when a substantial portion of changes due to stabilization are completed in said sample unit.

12. The method of claim 11 wherein changes due to stabilization include pressure changes due to cooling of pressurized gas or fluid supplied to said sample unit.

13. The method of claim 11 wherein said pressure changes due to stabilization include pressure changes due to stretch of said sample unit.

14. An automated method of determining a time to measure changes within units subject to a pneumatic testing procedure, comprising supplying pressurized gas or fluid from a source to a sample unit for fill time that will be used in subsequent pneumatic testing procedures, monitoring a variable within said sample unit, exhausting said sample unit of gas or fluid, repeating said supplying, monitoring and exhausting steps for a plurality of sample units, opening an orifice in fluid communication with one of said sample units, said orifice simulating a leak in said sample unit, repeating said supplying and monitoring steps within said one sample unit with said orifice open, computing from measurements made in said monitoring steps performed without the orifice open, a variance of said variable at each of a plurality of possible times, and computing a gauge repeatability factor at each of said several possible times based on said computed variance at a possible time, and a change measured on said one sample unit with said orifice open at a possible time, and selecting a stabilization time at which said gauge repeatability factor indicates satisfactory performance, filling subsequent units subject to pneumatic testing by supplying pressurized gas from a source to said subsequent units, for said fill time, and thereafter waiting until said stabilization time, and then measuring said variable within said subsequent units for acceptable performance.

15. The method of claim 14 wherein said pneumatic testing procedure is constrained to be completed within a specific time, and said monitoring steps monitor changes only during the time available for pneumatic testing after completion of said fill time.

16. The method of claim 14 wherein said gauge repeatability factor at a particular time is proportional to a computed variance at said time and inversely proportional to a reject limit at said time.

17. The method of claim 15 wherein said reject limit is a function of said variable measured on said one sample unit with said orifice open.

18. The method of claim 14 wherein said fill time is selected by supplying pressurized gas or fluid from a source to a sample unit for a period of time sufficient to bring pressure within said sample unit near to a pressure to be used during said testing procedure, decoupling said sample unit from said source, monitoring pressure within said sample unit following said decoupling to measure pressure changes due to stabilization of said sample unit, selecting a fill time that is a time when a substantial portion of said pressure changes due to stabilization are completed in said sample unit.

19. The method of claim 18 wherein said pressure changes due to stabilization include pressure changes due to cooling of pressurized gas or fluid supplied to said sample unit.

20. The method of claim 18 wherein said pressure changes due to stabilization include pressure changes due to stretch of said sample unit.

* * * * *

UNITED STATES PATENT AND TRADEMARK OFFICE
CERTIFICATE OF CORRECTION

PATENT NO. : 7,594,424 B2  Page 1 of 1
APPLICATION NO. : 11/336350
DATED : September 29, 2009
INVENTOR(S) : Jonathan Mark Fazekas It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 373 days.

Signed and Sealed this

Twenty-eighth Day of September, 2010

David J. Kappos
*Director of the United States Patent and Trademark Office*